United States Patent
Kamisuki et al.

(10) Patent No.: US 8,778,297 B2
(45) Date of Patent: Jul. 15, 2014

(54) SULFUR RECOVERY UNIT AND SULFUR RECOVERY METHOD

(75) Inventors: Tatsuo Kamisuki, Kanagawa (JP);
Hiroyuki Kosasayama, Kanagawa (JP);
Yasushi Yamada, Kanagawa (JP);
Shingo Arai, Kanagawa (JP); Mitsuru Kida, Kanagawa (JP)

(73) Assignee: JGC Corporation, Tokyo (JP)

( * ) Notice: Subject to any disclaimer, the term of this patent is extended or adjusted under 35 U.S.C. 154(b) by 0 days.

(21) Appl. No.: 14/007,971

(22) PCT Filed: Apr. 2, 2012

(86) PCT No.: PCT/JP2012/059016
§ 371 (c)(1),
(2), (4) Date: Sep. 27, 2013

(87) PCT Pub. No.: WO2012/133904
PCT Pub. Date: Oct. 4, 2012

(65) Prior Publication Data
US 2014/0017162 A1    Jan. 16, 2014

(30) Foreign Application Priority Data
Mar. 31, 2011 (JP) .................. 2011-080338

(51) Int. Cl.
*C01B 17/04* (2006.01)
*B01D 53/52* (2006.01)
*B01D 53/74* (2006.01)
*B01D 53/76* (2006.01)
*B01J 12/00* (2006.01)
*B01J 8/04* (2006.01)

(52) U.S. Cl.
CPC ............. *C01B 17/0447* (2013.01); *B01J 12/00* (2013.01); *B01J 8/0419* (2013.01); *B01J 2208/00256* (2013.01); *C01B 17/0404* (2013.01); *B01J 2208/0053* (2013.01); *C01B 17/0417* (2013.01)
USPC .............. 423/573.1; 423/574.1; 422/168; 422/169; 422/170; 422/177; 422/180

(58) Field of Classification Search
USPC ............ 423/573.1, 574.1; 422/168, 169, 170, 422/177, 180
See application file for complete search history.

(56) References Cited

U.S. PATENT DOCUMENTS 4,198,386 A * 4/1980 Laslo et al. ................ 423/574.1
2005/0235926 A1 * 10/2005 Thielert et al. ............. 122/13.01

FOREIGN PATENT DOCUMENTS

JP           2007-526205           9/2007

OTHER PUBLICATIONS

"International Preliminary Report on Patentability of PCT application"; this report contains the following items :Form PCT/IB/373, PCT/ISA237(cover sheet), PCT/ISA237(Box No. I),PCT/ISA237(Box No. V),PCT/ISA237(Box No. VIII), issued on Oct. 8, 2013, which is English translation of "Written Opinion of the International Searching Authority", p. 1-p. 10.
"International Search Report (Form PCT/ISA/210)", mailed on May 1, 2012, with English translation thereof, p. 1-p. 4.

* cited by examiner

*Primary Examiner* — Timothy Vanoy
(74) *Attorney, Agent, or Firm* — Jianq Chyun IP Office (57) ABSTRACT

A sulfur recovery unit comprising: a reaction furnace configured to carry out a high-temperature Claus reaction between hydrogen-sulfide-containing gas and oxygen-containing gas introduced to the reaction furnace; a sulfur condenser configured to cool reaction gas discharged from the reaction furnace and condense sulfur contained in the reaction gas; and a pipe that connects the reaction furnace to the sulfur condenser, wherein the reaction furnace is fixed to the ground; and the sulfur condenser and the pipe are arranged so as to be able to move relative to the reaction furnace.

13 Claims, 7 Drawing Sheets

SULFUR RECOVERY UNIT AND SULFUR RECOVERY METHOD

CROSS-REFERENCE TO RELATED APPLICATION

This application is a 371 application of an international PCT application serial no. PCT/JP2012/059016, filed on Apr. 2, 2012, which claims the priority benefit of Japan application no. 2011-080338, filed on Mar. 31, 2011. The entirety of each of the above-mentioned patent applications is hereby incorporated by reference herein and made a part of this specification.

FIELD

The present invention relates to a sulfur recovery unit and a sulfur recovery method for recovering elemental sulfur from hydrogen-sulfide-containing gas, which are suitable for use in a gas plant that continuously treats large quantities of gas, such as natural gas, containing hydrogen-sulfide-containing gas to produce purified gas.

BACKGROUND

Natural gas produced from natural gas wells contains sulfur compounds such as hydrogen sulfide, other sulfides, and thiophene. Crude oil from oil wells also contains sulfur compounds. Hydrocracking of crude oil produces hydrogen sulfide along with light gases. Since sulfur compounds turn into anticatalysts during reaction processes and into sulfur oxides (SOx) when burned, sulfur components are usually separated and recovered and not discharged directly. Because natural gas wells with low sulfur compound contents have been exploited actively first, natural gas currently produced from the remaining natural gas wells has sulfur compound concentrations as high as about 40% by weight.

Hence, gas plants and oil refinery plants are equipped with sulfur recovery units (hereinafter "SRUs") that absorb and separate hydrogen sulfide from natural gas with high hydrogen sulfur contents or from light gas and recover elemental sulfur. Recent SRUs have grown in size to accommodate the increase in sulfur compound concentration.

An SRU includes a reaction furnace configured to carry out a high-temperature Claus reaction. According to a high-temperature Claus reaction, hydrogen sulfide is reacted with oxygen in air at high temperatures to obtain elemental sulfur ($S_2$) and water ($H_2O$) from hydrogen sulfide ($H_2S$). The high-temperature Claus reaction is carried out at a temperature over 850° C.

The reaction furnace also serves as a waste heat boiler (WHB) in order to effectively use reaction heat generated by the Claus reaction. In a WHB, the reaction gas is subjected to primary cooling and heat is recovered as high-pressure steam. Since the reaction gas contains remaining sulfur compounds such as hydrogen sulfide and sulfur oxides, an SRU is further equipped with a reactor configured to heat the reaction gas, which has been subjected to primary cooling, with low-pressure steam to induce a catalytic Claus reaction and convert unreacted hydrogen sulfide into elemental sulfur. Sulfur in the gas that has reacted in the reaction furnace or reactor is cooled to about 140° C. and is recovered as liquid sulfur. An SRU process is, for example, disclosed in Patent literature No. 1.

Since the reaction gas has a high temperature as discussed above, the pipes and devices constituting the SRU expand due to heat as the temperature rises. However, since the displacement thereof is restrained, thermal stresses are generated. Accordingly, measures against thermal expansion have been taken in the pipes and devices constituting the SRU, such as increasing the strength of surrounding portions of nozzles of the devices so that the surrounding portions have a sufficient strength against thermal stresses generated in the nozzle section or installing pipe structures that absorb thermal expansion or contraction so as to decrease thermal stresses generated in the pipe and the nozzle section. Such pipe structures are installed in the middle of pipes and bent into a ring shape so as to absorb the expansion or contraction generated by the temperature difference and are thus called "expansion loops".

Figure 1:
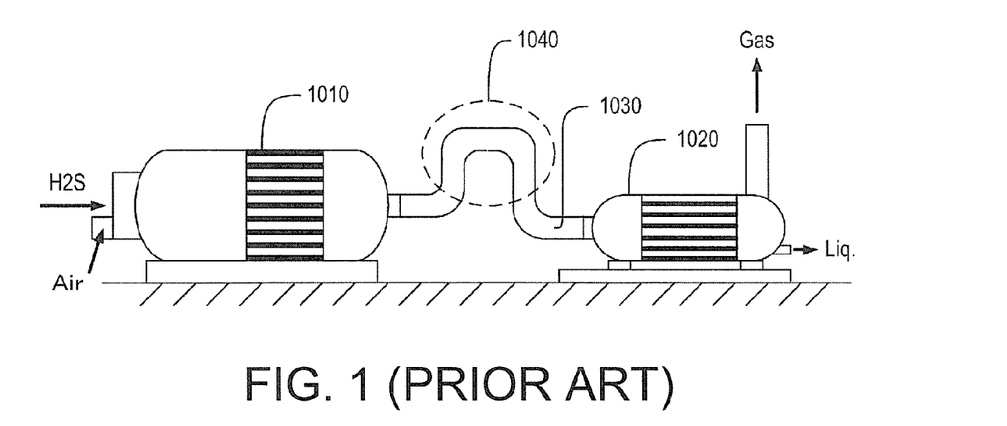
FIG. 1 is a diagram illustrating one example of a pipe used in a sulfur recovery unit.

FIG. 1 is a diagram illustrating an example of a typical SRU. The SRU in FIG. 1 includes a reaction furnace 1010 for mixing and incinerating hydrogen sulfide ($H_2S$) and air to carry out a high-temperature Claus reaction, a condenser 1020 that cools the reaction gas, and a pipe 1030 that connects the reaction furnace 1010 and the condenser 1020. The pipe 1030 includes an expansion loop 1040. The reaction furnace 1010, the condenser 1020, and the pipe 1030 thermally expand when heated to high temperatures and thermal stresses are generated as a result. Deformation caused by the thermal expansion is absorbed by elastic deformation of the expansion loop 1040 of the pipe 1030 between the reaction furnace 1010 and the condenser 1020. This decreases the thermal stresses applied to the nozzles of devices. In order to avoid excessive deformation due to thermal stresses, the nozzles of the reaction furnace 1010 and the condenser 1020 are designed to have a thickness and strength sufficient to withstand the thermal stresses. In order to ensure there be sufficient elastic deformation in a direction of the thermal expansion or thermal contraction, the expansion loop is provided in a direction orthogonal to the direction of thermal expansion or thermal contraction. In FIG. 1, only one expansion loop is provided. However, two or more expansion loops are desirably provided when the displacement caused by thermal expansion or thermal contraction of the pipe is expected to be large.

CITATION LIST

Patent Literature

Patent literature No. 1: Japanese Laid-open Patent Publication No. 2007-526205.

SUMMARY

Technical Problem

In the case of steel materials, thermal expansion and thermal contraction can be theoretically determined from the thermal expansion coefficients and the temperature difference. Theoretically, the devices and pipe expand during operation when the temperature increases, and return to their original positions when the operation is discontinued and temperature decreases. However, in actual plants, sliding device saddles and pipe support points do not always return to their original positions. This is because the temperature of the pipe system does not necessarily increase or decrease uniformly or at a particular rate. Furthermore, "stress relaxation" occurs where a pipe has deformed during operation and absorbed thermal elongation, thereby causing the saddles and support points not to return to their original positions.

When the devices and pipe do not return to their original positions, the positions of the devices and pipe change as a result of repeated thermal expansion and thermal contraction, resulting in instability of system behavior. As a result, an unexpected load may act on the nozzles of devices and pipe support points. To address this, anchor points and guide supports are provided in the reaction furnace 1010 and the devices and pipes downstream of the reaction furnace 1010 so as to stabilize the behavior of the system from the reaction furnace to the anchor point. Then measures for absorbing thermal expansion that occurs in the line from the reaction furnace 1010 to the anchor point downstream of the reaction furnace are needed.

In a typical SRU, devices constituting the SRU are fixed in place and deformation caused by thermal expansion is absorbed by pipes between devices. Thus, expansion loops have been provided and the shape of the pipes has become complex in order to enhance flexibility. In recent years, the size of SRU plants has increased and the amount of the hydrogen sulfide gas processed has increased to, for example, 4000 ton/day. An 80-inch pipe is employed in such a plant. In order to impart a deformation-absorbing function to a loop with a pipe size of 80 inches, an expansion loop as large as about 12 m×8 m in size is needed and the area needed to install the whole unit is also large. This expansion loop increases the amount of pipe materials needed and the length of the piping, increases the size of the plant layout of the SRU, and raises the cost.

An object of an aspect of the present invention is to reduce the expansion loops for absorbing thermal expansion and thermal contraction and reduce the size of the layout.

Solution to Problem

Embodiments that address the above-described object are as follows.

1. A sulfur recovery unit including: a reaction furnace configured to carry out a high-temperature Claus reaction between hydrogen-sulfide-containing gas and oxygen-containing gas introduced to the reaction furnace; a first sulfur condenser configured to cool reaction gas discharged from the reaction furnace and condense sulfur contained in the reaction gas; a reheater configured to re-heat condensed gas discharged from the first sulfur condenser; a catalytic Claus reactor configured to conduct a catalytic Claus reaction of reaction gas discharged from the reheater; a second sulfur condenser configured to cool reaction gas discharged from the catalytic Claus reactor and condense sulfur contained in the reaction gas; and a separator that allows sulfur droplets accompanying reaction gas discharged from the second sulfur condenser to collide with each other and removes the droplets thereby made larger, wherein the reaction furnace and at least one device selected from the group consisting of the reheater, the catalytic Claus reactor, the second sulfur condenser, and the separator are fixed to ground, and a device positioned between the fixed devices is disposed so as to be able to move relative to the fixed devices so that thermal stresses can be absorbed even when the temperature is increased due to a high-temperature Claus reaction or a catalytic Claus reaction. The sulfur recovery unit is to reduce the number of the expansion loops for absorbing thermal expansion and thermal contraction and reduce the size of the layout.

2. The sulfur recovery unit according to Item 1, further including: a second reheater configured to re-heat condensed gas discharged from the second sulfur condenser; a second catalytic Claus reactor configured to conduct a catalytic Claus reaction of reaction gas discharged from the second reheater; and a third sulfur condenser configured to cool reaction gas discharged from the second catalytic Claus reactor and condense sulfur contained in the reaction gas, wherein the reaction furnace and at least one device selected from the group consisting of the reheater, the second reheater, the catalytic Claus reactor, the second catalytic Claus reactor, the second and third sulfur condensers, and the separator are fixed to ground, and a device positioned between the fixed devices is disposed so as to be able to move relative to the fixed devices so that thermal stresses can be absorbed even when the temperature is increased due to a high-temperature Claus reaction or a catalytic Claus reaction.

3. The sulfur recovery unit according to Item 2, further including: a third reheater configured to re-heat condensed gas discharged from the third sulfur condenser; a third catalytic Claus reactor configured to conduct a catalytic Claus reaction of reaction gas discharged from the third reheater; and a fourth sulfur condenser configured to cool reaction gas discharged from the third catalytic Claus reactor and condense sulfur contained in the reaction gas, wherein the reaction furnace and at least one device selected from the group consisting of the reheater, the second and third reheaters, the catalytic Claus reactor, the second and third catalytic Claus reactors, the second to fourth sulfur condensers, and the separator are fixed to ground; and a device positioned between the fixed devices is disposed so as to be able to move relative to the fixed devices so that thermal stresses can be absorbed even when the temperature is increased due to a high-temperature Claus reaction or a catalytic Claus reaction.

4. The sulfur recovery unit according to any one of Items 1 to 3, further including a pipe that connects the reaction furnace to the sulfur condenser, the pipe having a letter U shape so that thermal expansion or thermal contraction is not restrained. Because the pipe has the letter U shape, thermal expansion or thermal contraction in a front end direction of the letter U is not restrained and thermal stresses due to the thermal expansion or thermal contraction in the front end direction do not occur in the pipe, and the thermal stresses appeared in the pipe are reduced.

5. The sulfur recovery unit according to any one of Items 1 to 4, further including: a foundation section fixed to ground, wherein the sulfur condenser is disposed on the foundation section so as to be able to move, and the foundation section has a slip-prevention member that restrains movements of the sulfur condenser. In addition, devices or pipes whose movements are restrained by the slip-prevention member undergo thermal expansion but the thermal expansion is absorbed by stress relaxation. Therefore, even when the thermal expansion and contraction are restrained by the slip-prevention member, the thermal stresses generated in the pipe are small, the force (load) generated in a pipe system is redistributed, and excessively large thermal stresses do not occur in a nozzle section or the pipe system.

6. The sulfur recovery unit according to any one of Items 1 to 5, wherein the reheater heats the reaction gas discharged from the sulfur condenser and is disposed above the sulfur condenser so as to be able to move relative to the sulfur condenser, and the reheater includes a supporting member that supports the reheater and allows the reheater to undergo displacement in a vertical direction. An upward force is applied to the supporting member of the reheater. Because the supporting member allows displacements of the pipe in a perpendicular direction, the reheater is arranged so as to be able to move in the perpendicular direction relative to the sulfur condenser, a restraining force in the direction of movements caused by thermal expansion is reduced, and the number of expansion loops between the movable devices can be decreased and the layout can be further reduced in size.

7. The sulfur recovery unit according to any one of Items 1 to 6, wherein the reheater, the catalytic Claus reactor, and the second sulfur condenser are arranged so as to be able to move and the separator is fixed in place relative to a horizontal direction.

8. A sulfur recovery method for recovering sulfur from hydrogen sulfide-containing gas and oxygen-containing gas, the method including: introducing hydrogen-sulfide-containing gas and oxygen-containing gas into a reaction furnace and carrying out a high-temperature Claus reaction between the hydrogen-sulfide-containing gas and the oxygen-containing gas; cooling reaction gas discharged from the reaction furnace to condense sulfur contained in the reaction gas by using a first sulfur condenser; re-heating condensed gas, which has been discharged from the first sulfur condenser, by using a reheater; carrying out a catalytic Claus reaction of reaction gas, which has been discharged from the reheater, by using a catalytic Claus reactor; cooling reaction gas discharged from the catalytic Claus reactor to condense sulfur contained in the reaction gas by using a second sulfur condenser; and allowing sulfur droplets accompanying reaction gas discharged from the second sulfur condenser to collide with each other and removing the droplets thereby made larger by using a separator, wherein the reaction furnace and at least one device selected from the group consisting of the reheater, the catalytic Claus reactor, the second sulfur condenser, and the separator are fixed to ground, and a device positioned between the fixed devices is disposed so as to be able to move relative to the fixed devices so that thermal stresses can be absorbed even when the temperature is increased due to a high-temperature Claus reaction or a catalytic Claus reaction. Since the pressure loss occurring in pipes used in the sulfur recovery method of present embodiment is small, the pressure for feeding oxygen-containing gas can be decreased.

9. The sulfur recovery method according to Item 8, further including: re-heating condensed gas, which has been discharged from the second sulfur condenser, by using a second reheater; carrying out a catalytic Claus reaction of reaction gas by using a second catalytic Claus reactor, the reaction gas being discharged from the second reheater; and cooling reaction gas discharged from the second catalytic Claus reactor and condensing sulfur contained in the reaction gas by using a third sulfur condenser, wherein the reaction furnace and at least one device selected from the group consisting of the reheater, the second reheater, the catalytic Claus reactor, the second catalytic Claus reactor, the second and third sulfur condensers, and the separator are fixed to ground, and a device positioned between the fixed devices is disposed so as to be able to move relative to the fixed devices so that thermal stresses can be absorbed even when the temperature is increased due to a high-temperature Claus reaction or a catalytic Claus reaction.

10. The sulfur recovery method according to Item 9, further including: re-heating condensed gas, which has been discharged from the third sulfur condenser, by using a third reheater; carrying out a catalytic Claus reaction of reaction gas by using a third catalytic Claus reactor, the reaction gas being discharged from the third reheater; and cooling reaction gas discharged from the third catalytic Claus reactor and condensing sulfur contained in the reaction gas by using a fourth sulfur condenser, wherein the reaction furnace and at least one device selected from the group consisting of the reheater, the second and third reheaters, the catalytic Claus reactor, the second and third catalytic Claus reactors, the second to fourth sulfur condensers, and the separator are fixed to ground, and a device positioned between the fixed devices is disposed so as to be able to move relative to the fixed devices so that thermal stresses can be absorbed even when the temperature is increased due to a high-temperature Claus reaction or a catalytic Claus reaction.

11. The sulfur recovery method according to any one of Items 8 to 10, wherein a pipe that connects the reaction furnace to the sulfur condenser has a letter U shape so that thermal expansion or thermal contraction is not restrained.

12. The sulfur recovery method according to any one of Items 8 to 11, wherein the sulfur condenser is disposed on a foundation section so as to be able to move, and the foundation section is fixed to ground and has a slip-prevention member that restrains movements of the sulfur condenser.

13. The sulfur recovery method according to any one of Items 8 to 12, wherein the reheater heats the reaction gas discharged from the sulfur condenser and is disposed above the sulfur condenser and arranged so as to be able to move relative to the sulfur condenser; a second pipe connects the sulfur condenser to the reheater; and the reheater includes a supporting member that supports the reheater and allows the reheater to undergo displacement in a vertical direction.

DESCRIPTION OF EMBODIMENTS

1. Sulfur Recovery Unit

Figure 2:
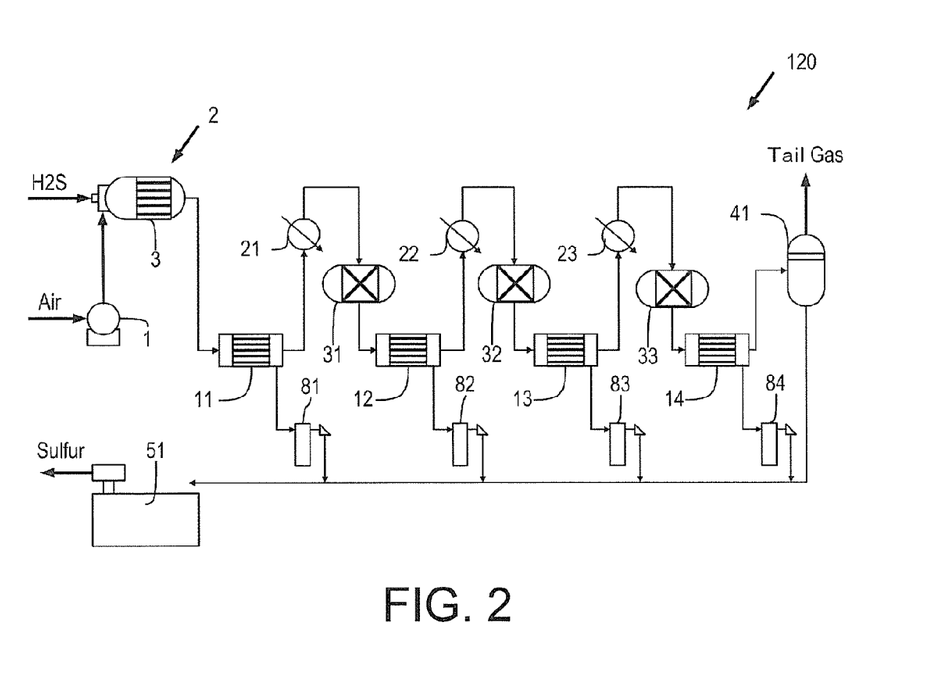
FIG. 2 is a diagram illustrating one example of a sulfur recovery unit.

FIG. 2 is a diagram illustrating an example of a sulfur recovery unit. A sulfur recovery unit (SRU) 120 in FIG. 2 includes an air blower 1, a reaction furnace 2, a first sulfur condenser 11, a second sulfur condenser 12, a third sulfur condenser 13, a fourth sulfur condenser 14, a first reheater 21, a second reheater 22, a third reheater 23, a first Claus reactor 31, a second Claus reactor 32, a third Claus reactor 33, a coalescer 41, a sulfur pit 51, a first seal leg 81, a second seal leg 82, a third seal leg 83, and a fourth seal leg 84.

The reaction furnace 2 burns hydrogen sulfide along with air sent from the air blower 1 at high temperature to oxidize hydrogen sulfide and separate hydrogen sulfide into sulfur ($S_2$) and water ($H_2O$). This reaction is called "high-temperature Claus reaction". The high-temperature Claus reaction is described below by using formulae 1 and 2.

The reaction furnace 2 includes a waste heat boiler 3. The waste heat boiler 3 induces heat exchange between the reaction gas and boiler feed water (BFW) to cool the reaction gas and generate high-pressure or medium-pressure steam.

The first sulfur condenser 11 cools sulfur contained in the reaction gas discharged from the reaction furnace 2 and condenses (liquefies) sulfur. Liquid sulfur discharged from the first sulfur condenser 11 passes through a free drain pipe. The free drain pipe is communicated with the sulfur liquid in the first seal leg 81 to seal the reaction portion on the side of the first sulfur condenser 11 side.

The first seal leg 81 is cylindrical or rectangular prism in shape and maintained at a pressure close to atmospheric pressure. However, since the pressure in the first sulfur condenser 11 is high, the height of the first seal leg 81 is designed to maintain a sufficient sulfur liquid depth so as to prevent the sulfur liquid in the first seal leg 81 from being blow away and to keep the sealing function. The sulfur liquid retained in the first seal leg 81 overflows when a particular liquid height needed for sealing is exceeded and flows into the sulfur pit 51. The sulfur pit 51 is usually located underground so that the liquid sulfur supplied from the seal legs is recovered by a free drain system. The second seal leg 82, the third seal leg 83, and the fourth seal leg 84 have the same function as the first seal leg 81.

The temperature of the catalytic Claus reaction is higher than the temperature at which the sulfur is cooled to liquid. Thus, the first reheater 21 reheats the reaction gas, from which sulfur has been separated by the first sulfur condenser 11, to the reaction temperature of the catalytic Claus reaction.

The first Claus reactor 31 includes an oxidation catalyst layer that catalyzes the reaction of hydrogen sulfide remaining in the reaction gas and a Claus catalyst layer that catalyzes the reaction between sulfur dioxide and hydrogen sulfide in the reaction gas and generates sulfur-containing reaction gas. The Claus catalyst layer is provided downstream of the oxidation catalyst layer. The catalyst that catalyzes oxidation of hydrogen sulfide is preferably at least one selected from the group consisting of $Fe_2O_3$-$Al_2O_3$, NiO-$Al_2O_3$, $TiO_2$, $V_2O_3$-$TiO_2$, and $MoO_3$-$TiO_2$. The Claus catalyst may be alumina or titania used in typical processes.

The first Claus reactor 31 allows the oxidation catalyst layer and the Claus catalyst layer to come into contact with reaction gas discharged from the first sulfur condenser 11 to perform a catalytic Claus reaction and generate sulfur.

The reaction gas discharged from the first Claus reactor 31 is fed to the second sulfur condenser 12 to cool the reaction gas and condense sulfur as in the first sulfur condenser 11. In this embodiment, the number of Claus reactors is three. However, this number changes depending on the sulfur conversion rate of each reaction. For example, when the sulfur conversion rate of each Claus reactor is high or when the sulfur yield of SRU is to be decreased, the number of Claus reactors may be 2.

As with the first sulfur condenser 11, the second sulfur condenser 12 and the third sulfur condenser 13 each condense sulfur and feed liquid sulfur to the sulfur pit 51 and unreacted hydrogen sulfide to a reheater downstream. As with the first Claus reactor 31, the second Claus reactor 32 and the third Claus reactor 33 allow a catalytic Claus reaction to occur and generate sulfur from hydrogen sulfide.

The coalescer 41 removes liquid sulfur in the reaction gas by using a filter that causes sulfur droplets accompanying the reaction gas discharged from the fourth sulfur condenser 14 to contact each other and thereby increases the size of droplets. The coalescer 41 then feeds sulfur to the sulfur pit 51.

2. Sulfur Recovery Process

Hydrogen sulfide is oxidized through a high-temperature Claus reaction in the reaction furnace 2 and gives sulfur ($S_2$) and water ($H_2O$). The reaction is represented by formulae 1 and 2 below:

$$H_2S + 3/2 O_2 \rightarrow SO_2 + H_2O \quad \text{(Formula 1)}$$

$$2H_2S + SO_2 \rightarrow 3S + 2H_2O \quad \text{(Formula 2)}$$

The high-temperature Claus reaction is performed at 1000° C. to 1400° C.

The waste heat boiler 3 of the reaction furnace 2 cools the reaction gas having a temperature of 1000° C. to 1400° C. to a temperature in a range of 250° C. to 400° C. by using BFW. The reaction gas from which heat is recovered in the waste heat boiler 3 is further cooled to 130° C. to 150° C. in a sulfur condenser to condense and separate sulfur in the reaction gas. The sulfur conversion rate of the high-temperature Claus reaction performed in the reaction furnace 2 is about 70%. Hydrogen sulfide remaining in the reaction gas and sulfur dioxide generated by combustion are fed to a Claus reactor downstream of the reaction furnace 2 and hydrogen sulfide is converted into sulfur by using a catalyst.

The pressure of the sulfur recovery unit 120 decreases from the reaction furnace 2 toward the outlet of the coalescer 41 due to pressure losses in devices and pipes. In other words, the pressure in the reaction furnace 2 is the highest. As the sulfur recovery unit 120 grows in size, the capacity of the air blower 1 that supplies oxygen in formula 1 by supplying air is increased and the increase in discharge pressure increases the power the air blower 1 needs. Accordingly, the power of the air blower 1 can be lowered by decreasing the pressure losses in the devices and pipes of the sulfur recovery unit 120. In the sulfur recovery unit 120 according to the present invention, the size of layout is reduced and the pipe length is shortened. Thus, the pressure losses in the pipe can be reduced and the power of the air blower 1 can be decreased in the sulfur production process. Moreover, since the operating pressure is low, the height of the seal leg for sealing can be decreased.

The catalytic Claus reaction involves the same chemical reaction as formula 2 and gives sulfur. However, the reaction temperature is lower than that of the high-temperature Claus reaction and is about a temperature (240° C. to 350° C.) equal to or higher than the due point of sulfur. The reaction gas cooled by the sulfur condenser and discharged from the sulfur condenser is reheated to a reaction temperature of the catalytic Claus reaction in a reheater and fed to the Claus reactor.

In order to increase the sulfur recovery rate from unreacted gas, two or more sets of a sulfur condenser, a reheater, and a Claus reactor are provided. In the example illustrated in FIG. 2, sulfur is recovered by using three sets of reactors and ultimately 98% of sulfur components are recovered as sulfur. The unreacted gas separated with the coalescer 41 is tail gas and supplied to a tail gas treating unit (TGT) not illustrated in FIG. 2. TGT removes sulfur remaining in the gas by using an amine solution or the like and burns the tail gas with flares.

3. Arrangement of Sulfur Recovery Unit

Figure 3A:
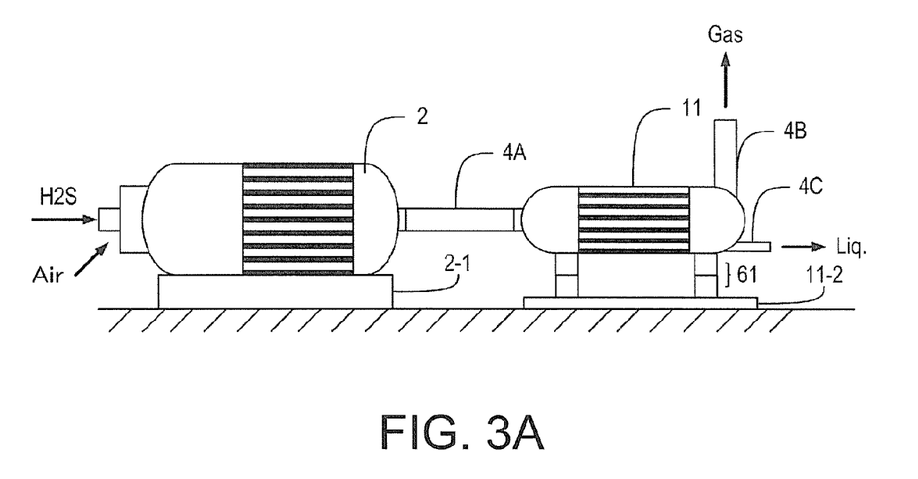
FIG. 3A is a side views illustrating one example of arrangement of a sulfur recovery unit.

FIG. 3A is a side view illustrating an example of arrangement of a sulfur recovery unit. FIG. 3 illustrates the reaction furnace 2 and the first sulfur condenser 11 as part of the sulfur recovery unit 120 in FIG. 2. The reaction furnace 2 and the first sulfur condenser 11 are connected to each other through a pipe 4A through which reaction gas flows. The reaction furnace 2 is fixed to the ground to prevent moving. For example, the reaction furnace 2 is fixed with bolts to a foundation 2-1 fixed to the ground. The first sulfur condenser 11 feeds reaction gas unreacted in the reaction furnace 2 to the first reheater 21 (not illustrated in FIG. 3) downstream through a pipe 4B. Liquid sulfur (Liq.) obtained by condensation is discharged to the sulfur pit 51 through a pipe 4C.

3.1. Movements of Devices in Horizontal Direction

The first sulfur condenser 11 has a sliding section 61. The sliding section 61 reduces the frictional force between the first sulfur condenser 11 and the ground and the first sulfur condenser 11 is arranged so as to be able to move relative to the ground and the reaction furnace 2. For example, when the pipe 4A thermally expands, the first sulfur condenser 11 also thermally expands in a horizontal direction (reaction gas downstream direction) because the reaction furnace 2 is immovable. Since the first sulfur condenser 11 is able to move, the first sulfur condenser 11 can move in response to displacements caused by thermal expansion of the reaction furnace 2, the pipe 4A, and the first sulfur condenser 11. As a result, the pipe 4A no longer needs a large expansion loop as illustrated in FIG. 1, the distance between the reaction furnace 2 and the first sulfur condenser 11 can be decreased, and the size of the layout of the SRU can be reduced.

Figure 3B:
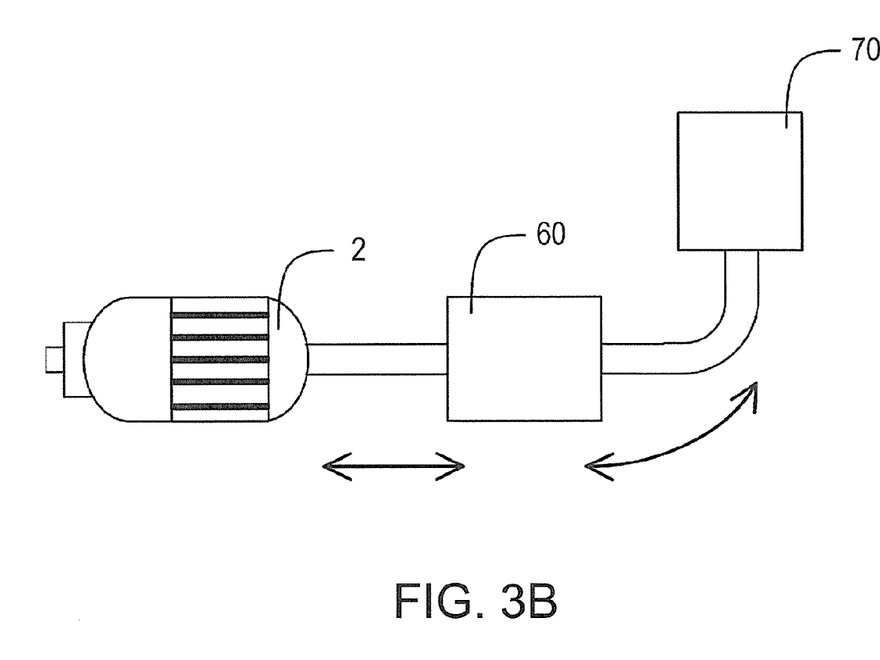
FIG. 3B is a plan view illustrating an example of arrangement of a reactor and a sulfur condenser.
Figure 3C:
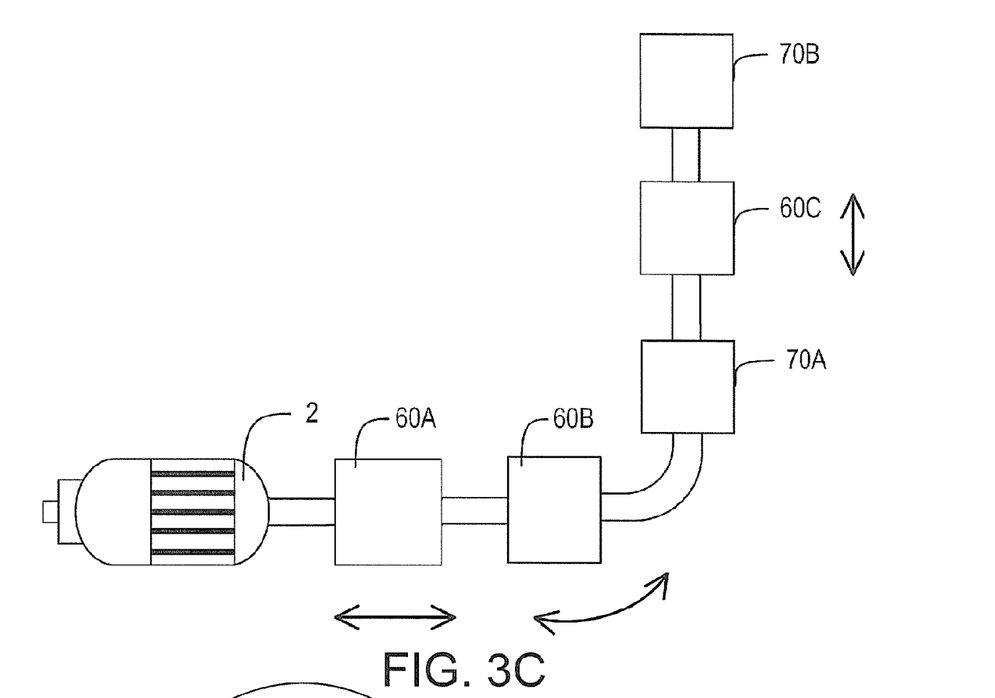
FIG. 3C is a plan view illustrating an example of arrangement of a reactor and a sulfur condenser.

3.2 Thermal Stress Analysis of an Integrated Model Constituted by Devices and Pipes FIGS. 3B and 3C are each a plan view illustrating an example of an arrangement of a sulfur recovery unit. In FIG. 3B, a fixed device 70 is fixed in place at the downstream of a reaction furnace 2 and a device 60 is arranged so that it can move relative to the reaction furnace 2 and the fixed device 70. The fixed device 70 is, for example, at least one device selected from a reheater, a catalytic Claus reactor, a second sulfur condenser, and a separator. As illustrated in FIG. 3C, a sulfur recovery unit 120 may include a plurality of fixed devices 70A and 70B, the reactor 2, a plurality of movable devices 60A and 60B between the reactor 2 and the fixed device 70A, and a movable device 60C between the fixed devices 70A and 70B. The movable devices are devices that constitute the sulfur recovery unit 120 but are not fixed devices.

The device 60 is arranged so that it can move and absorb the thermal stress in the case where the temperature is increased by a high-temperature Claus reaction or a catalytic Claus reaction. Usually, in plant designing, all devices are fixed and thermal stresses that are generated in the pipes between the devices are calculated. In this case, there is a need to provide bends and expansion loops in the pipe system in order to absorb thermal stresses. However, when this usual designing is implemented on a sulfur recovery unit that involves large pipe diameters and handles high temperatures, a large number of large expansion loops and a huge pipe layout are desirably provided. Thus, in a sulfur recovery unit of this embodiment, devices in the middle are left without being fixed so that they can move and absorb thermal stresses. As a result, a significantly compact design that provides a linear layout pipe system is realized. Since a plurality of devices move simultaneously, thermal stress analysis must be integrally conducted on a sulfur recovery unit constituted by a plurality of devices. The amount of movement caused by thermal expansion and contraction is estimated by analysis and the device 60 is arranged so that the device does not fall off the foundation. As a result, the device 60 moves and absorbs the thermal stress but does not fall off the foundation. Thus, the sulfur recovery unit can be operated smoothly.

Thermal stress analysis is carried out by executing a thermal stress analysis program through a computer. First, a model of devices and pipes is constructed based on material characteristics and shape. The temperature/pressure conditions and boundary conditions for the model of the devices and pipes are assigned and thermal stress analysis is carried out on an entire model including the devices and pipes to calculate the stresses and loads imposed on the devices by numerical analysis. Conditions that restrain thermal expansion and weights of the devices and pipes are considered as the boundary conditions. However, in constructing a model, a range from a fixed point to a fixed point needs to be included. Accordingly, when some of the devices are left slidable without being fixed, these devices must be installed between fixed devices. This makes it inappropriate to conduct partial analysis and thus an integral analysis is desirable. The thermal stress analysis is usually conducted by a finite element method (FEM) or the like.

Figure 4:
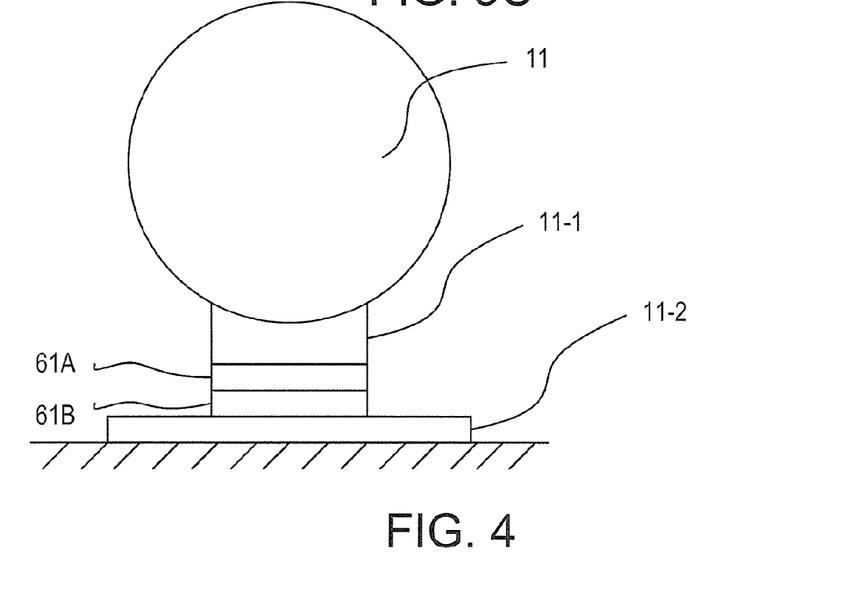
FIG. 4 is a diagram illustrating an example of arrangement of a sulfur recovery unit.

FIG. 4 is a side view illustrating an example of a device having a sliding section. A sliding section 61 illustrated in the drawing is, for example, constituted by a sliding plate 61A and a sliding plate 61B. The sliding plate 61A, which reduces frictional force, is provided at the end of a leg portion 11-1 of the first sulfur condenser 11 and the sliding plate 61B is provided on a foundation 11-2 on the ground. Since the first sulfur condenser 11 is arranged on the ground with the sliding plate 61A and the sliding plate 61B therebetween, the first sulfur condenser 11 can easily move relative to the ground.

Figure 5:
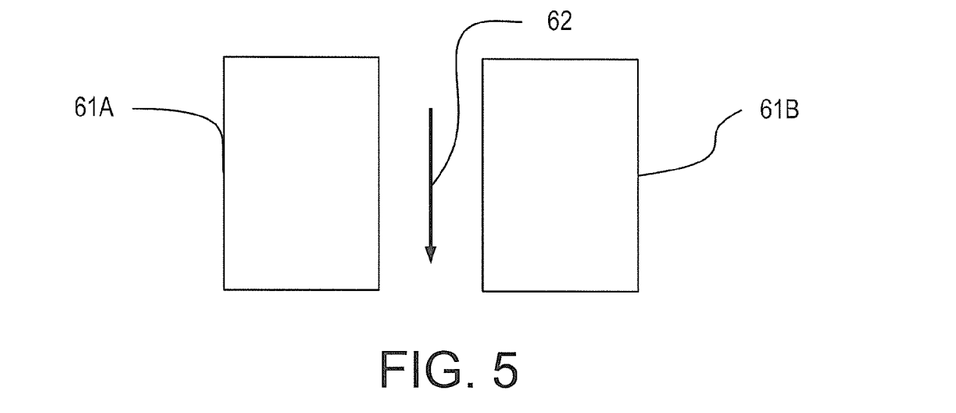
FIG. 5 is a side view illustrating an example of a device equipped with a sliding section.

FIG. 5 is a top view illustrating examples of sliding plates. The sliding plate 61A and the sliding plate 61B are illustrated in FIG. 5. The sliding plates 61A and 61B are arranged by considering the thermal expansion of the pipe 4A in FIG. 3 so that the longitudinal direction of the sliding plates coincides with a direction 62 in which the pipe 4A undergoes displacement. In this manner, the sliding plate 61A can be prevented from falling off the sliding plate 61B. The coefficient of friction between the sliding plate 61A and the sliding plate 61B is smaller than the coefficient of friction between the first sulfur condenser 11 and the foundation 11-2 without the sliding plate 61A and the sliding plate 61B. Accordingly, the frictional force acting on the first sulfur condenser 11 can be decreased by using the sliding plate 61A and the sliding plate 61B.

Figure 6A:
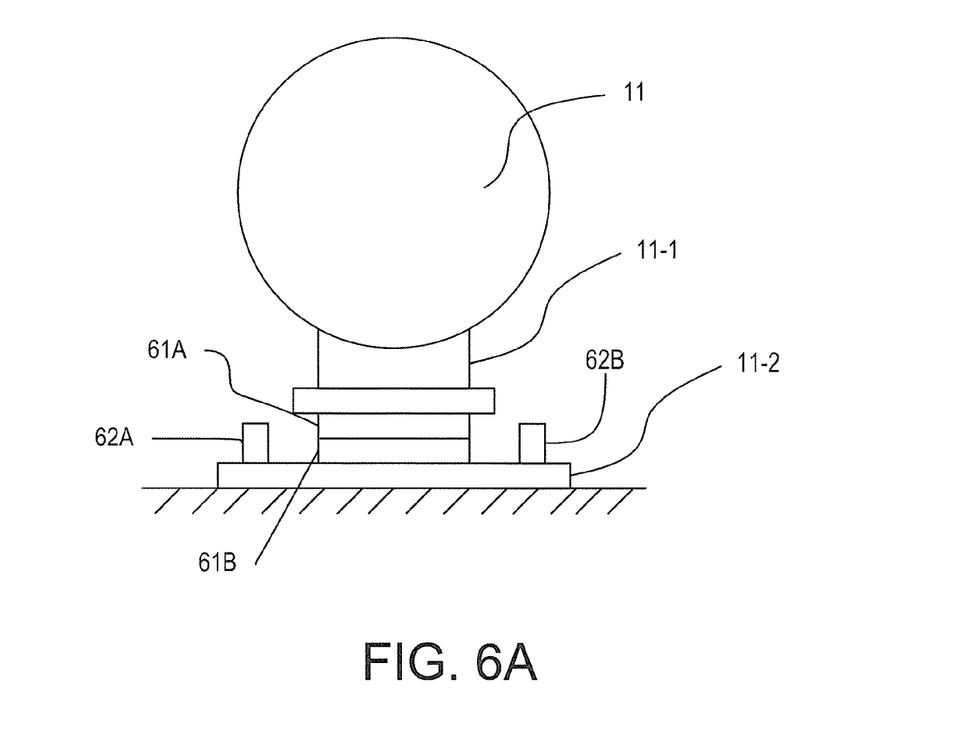
FIG. 6A is a side view illustrating an example of slip-prevention members.
Figure 6B:
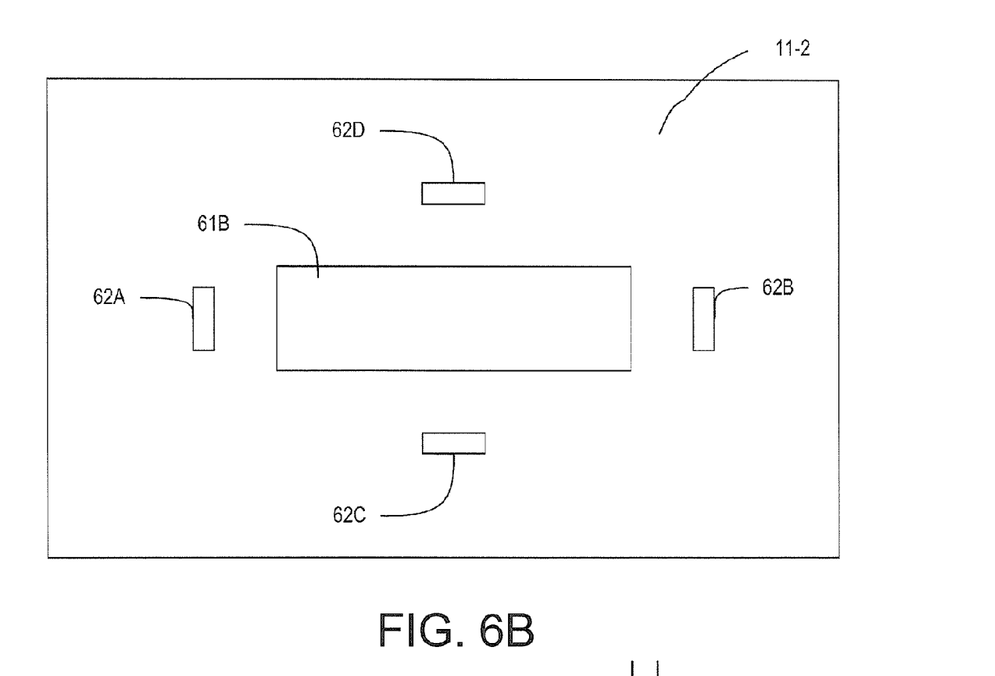
FIG. 6B is a top view illustrating an example of slip-prevention members.

FIG. 6A is a side view illustrating examples of slip-prevention members. As illustrated in the drawing, a slip-prevention member 62A and a slip-prevention member 62B are disposed on the foundation 11-2 and beside the sliding plate 61A and the sliding plate 61B. FIG. 6B is a top view illustrating examples of slip-prevention members. In FIG. 6B, the first sulfur condenser 11 is omitted from the drawing. As illustrated in the drawing, slip-prevention members 62A to 62D are arranged on the foundation 11-2 and beside the sliding plate 61B. The slip-prevention members 62A to 62D restrain the movements of the sliding plate 61A and prevent devices from falling off the foundation. Accordingly, even when the pipe undergoes stress relaxation and the position of the first sulfur condenser 11 gradually changes, the movements are restrained by the slip-prevention members and the devices can be prevented from falling off the foundation. The devices and pipes whose movements are restrained by the slip-prevention members undergo thermal expansion but the thermal expansion is absorbed by stress relaxation. Thus, even when the thermal expansion and contraction are restrained by the slip-prevention members, the magnitude of the thermal stresses generated in the pipes is small, the force (load) generated in the pipe system is redistributed, and excessively large thermal stresses do not occur in the nozzle section or the pipe system.

The positional relationship between the slip-prevention members and the sliding plates can be determined based on the frictional force of the device. When the weight of the device is large and the frictional force is large, the device does not move easily. Thus, the distance between the slip-prevention members and the sliding plates is decreased.

3.3. Movements of Device in Perpendicular Direction

Figure 7:
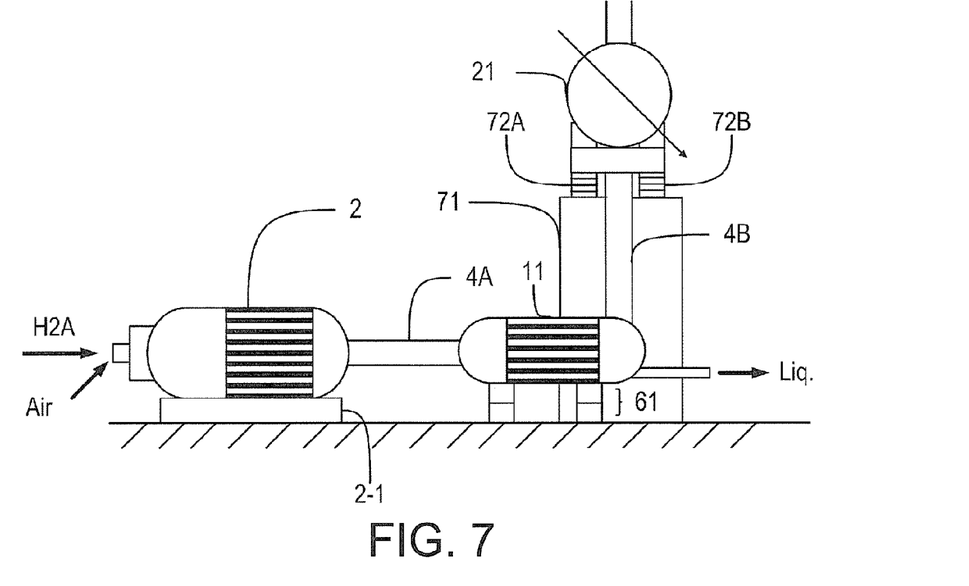
FIG. 7 is a diagram illustrating an example of arrangement of a sulfur recovery unit.

FIG. 7 is a drawing illustrating an example of arrangement of a sulfur recovery unit. FIG. 7 illustrates the reaction furnace 2, the first sulfur condenser 11, and the first reheater 21 which are part of the sulfur recovery unit 120 illustrated in FIG. 2. The reaction furnace 2, the first sulfur condenser 11, and the first reheater 21 are connected to one another through the pipes 4A and 4B through which the reaction gas flows. The first reheater 21 is arranged so as to be able to move relative to the first sulfur condenser 11. The first reheater 21 heats the reaction gas fed from the first sulfur condenser 11 to the reaction temperature of the catalytic Claus reaction and feeds the heated reaction gas to the first Claus reactor 31 downstream thereof The first reheater 21 is disposed on spring supports 72A and 72B on a rack 71. The spring supports 72A and 72B allow the pipe to undergo displacements in a vertical direction and thus have a fluctuating supporting capacity. When the pipe 4B thermally expands, upward force works on the side of the spring support 72A/72B the first reheater 21. The spring supports 72A and 72B allow displacements of the pipe 4B in the vertical direction and expand. As a result, the first reheater 21 is arranged so as to be able to move in the perpendicular direction relative to the first sulfur condenser 11.

As illustrated in FIG. 7, adjacent devices connected by pipes are arranged so as not to restrain movements of one another. Thus, the restraining force in the direction of movements caused by thermal expansion is reduced. As a result, the number of the expansion loops between the movable devices can be decreased and the size of the layout of the SRU can be further reduced.

3.4. Devices to be Made Immovable

FIGS. 4 and 7 are used to illustrate that movements of the first sulfur condenser 11 and the first reheater 21 are not restrained. All other sulfur condensers, reheaters, and Claus reactors may be arranged so as to be able to move in a horizontal direction or perpendicular direction relative to the ground or the upstream device as with the first sulfur condenser 11.

In this embodiment, as illustrated in FIG. 2, all movable devices except the coalescer 41 are arranged so as to be oriented horizontally. The devices oriented horizontally do not tilt even when they are moved. Accordingly, the devices oriented horizontally are arranged so as to be able to move except for the reaction furnace 2. In contrast, the coalescer 41 is arranged so as to be oriented vertically. Since a device vertically oriented is unstable when moved, the coalescer 41 is fixed to the ground. In sum, in the SRU according to this embodiment, the reaction furnace 2, which is located furthermost upstream in the SRU, and the coalescer 41, which is located furthermost downstream in the SRU, are the only devices that are made immovable, and the devices located between the reaction furnace 2 and the coalescer 41 are movable. As a result, the expansion loops for pipes between the reaction furnace 2 and the coalescer 41 can be eliminated as much as possible, and the size of the layout of the SRU can be reduced.

4. Shape of Pipes

As described above, pipe structures for absorbing thermal expansion and thermal contraction are no longer needed in the sulfur recovery unit 120 in which the devices downstream of the reaction furnace 2 are able to move. However, since movable devices are placed on the ground with gravity acting thereon, frictional force is generated between the devices and the ground. As a result, the frictional force obstructs movements of the devices and generates thermal stresses in the pipes.

Figure 8:
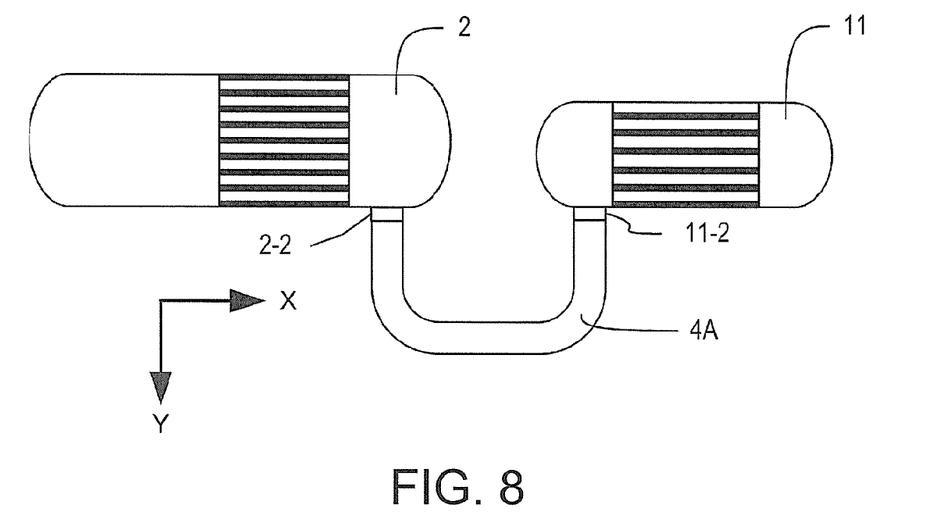
FIG. 8 is a plan view illustrating an example of arrangement of a reactor and a sulfur condenser.

FIG. 8 is a plan view illustrating an example of arrangement of a reaction furnace and a sulfur condenser. The pipe 4A connecting the reaction furnace 2 to the first sulfur condenser 11 does not directly connect the devices at opposing positions as illustrated in FIG. 3 but rather the pipe 4A connects a nozzle 2-2 and a nozzle 11-2 respectively provided at the side faces of the devices and has a letter U shape. Since the reaction furnace 2 is fixed to the ground, the connecting portion between the pipe 4A and the reaction furnace 2 is restrained and parts downstream of the connecting portion are able to move. However, since frictional force is generated between the first sulfur condenser 11 and the ground due to the weight of the first sulfur condenser 11, thermal stresses occur in the pipe 4A.

In the example illustrated in FIG. 8 in which the pipe 4A has a letter U shape, thermal expansion or thermal contraction in the Y direction illustrated in FIG. 8 is not restrained and thermal stresses due to the thermal expansion or thermal contraction in the Y direction do not occur in the pipe 4A. In contrast, movements in the X direction illustrated in FIG. 8 generate frictional force due to the first sulfur condenser 11 and thus thermal stresses occur in the pipe 4A. However, when the pipe 4A can freely move in the Y direction, thermal stresses are not generated in the Y direction and thus the thermal stresses on the pipe 4A can be reduced.

Whereas the expansion loop illustrated in FIG. 1 is installed in the middle of the pipe and has a supplementary shape suitable for such an installation, the letter U shape illustrated in FIG. 8 differs from that shape in that the letter U shape is needed for providing a connection between nozzles at the side faces of the devices. Whereas the expansion loop in FIG. 1 is provided to absorb thermal expansion and contraction generated in a pipe whose movements are restrained, the pipe in FIG. 8 designed to have a letter U-shape itself undergoes thermal expansion and contraction. When the positions of nozzles of the devices and the pipe are arranged so that the pipe has a letter U shape and the thermal expansion and contraction are not restrained, the pipe does not have to include an expansion loop even when frictional force occurs due to the movements of the movable devices. Thus, the size of the layout of the SRU can be reduced.

5. Valve

Figure 9:
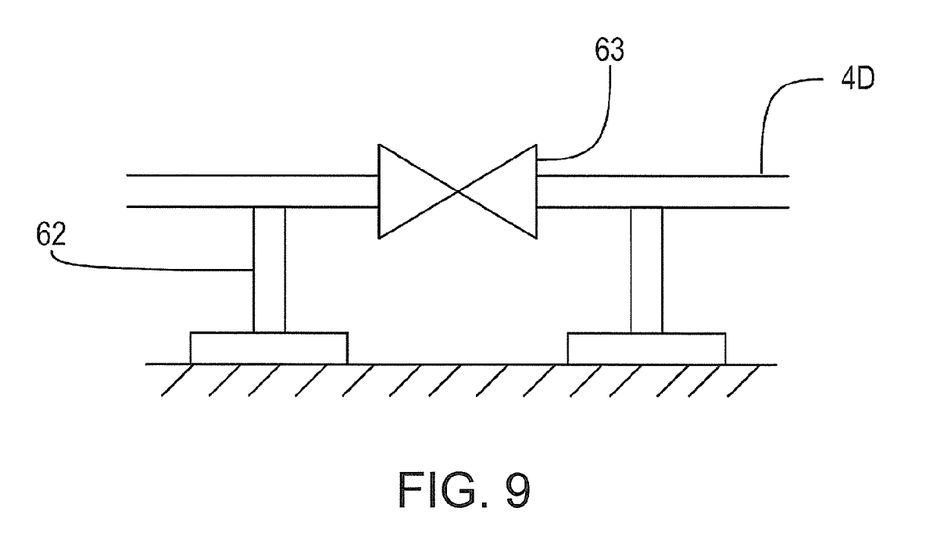
FIG. 9 is a diagram illustrating a valve installed in a pipe of a sulfur recovery unit.

FIG. 9 is a diagram illustrating a valve installed in a pipe of a sulfur recovery unit. In recent years, the throughput of SRUs has increased and the size of pipes is sometimes as large as about 80 inches. Installing a valve 63 in a pipe 4D having a large diameter increases the weight of the whole pipe since the pipe size is large. Thus, a support 62 that supports the pipe 4D is desirably provided. Since frictional force is generated between the support 62 and the pipe 4D, movements of the pipe 4D are restrained. This frictional force prevents the pipes from moving and generates thermal stresses in the pipe. In the SRU according to this embodiment, there is no need to provide valves in the pipes from the reaction furnace 2 to the coalescer 41. The SRU need not have any valves since a series of devices downstream of the reaction furnace 2 are continuously and simultaneously operated and there is no need to divide the line in the middle. Moreover, since rotating devices, such as pumps and compressors, whose operation range is limited are not included in the SRU, there is no need to provide control valves. Accordingly, the pipes used in the SRU according to this embodiment do not have any valves and are thus light-weight. As a result, the pipes can move easily in response to thermal expansion and thermal contraction and the thermal stresses generated by the frictional force caused by the weight of the pipe are reduced. Thus, expansion loops for valves are not needed.

6. Sulfur Recovery Method

Figure 10:
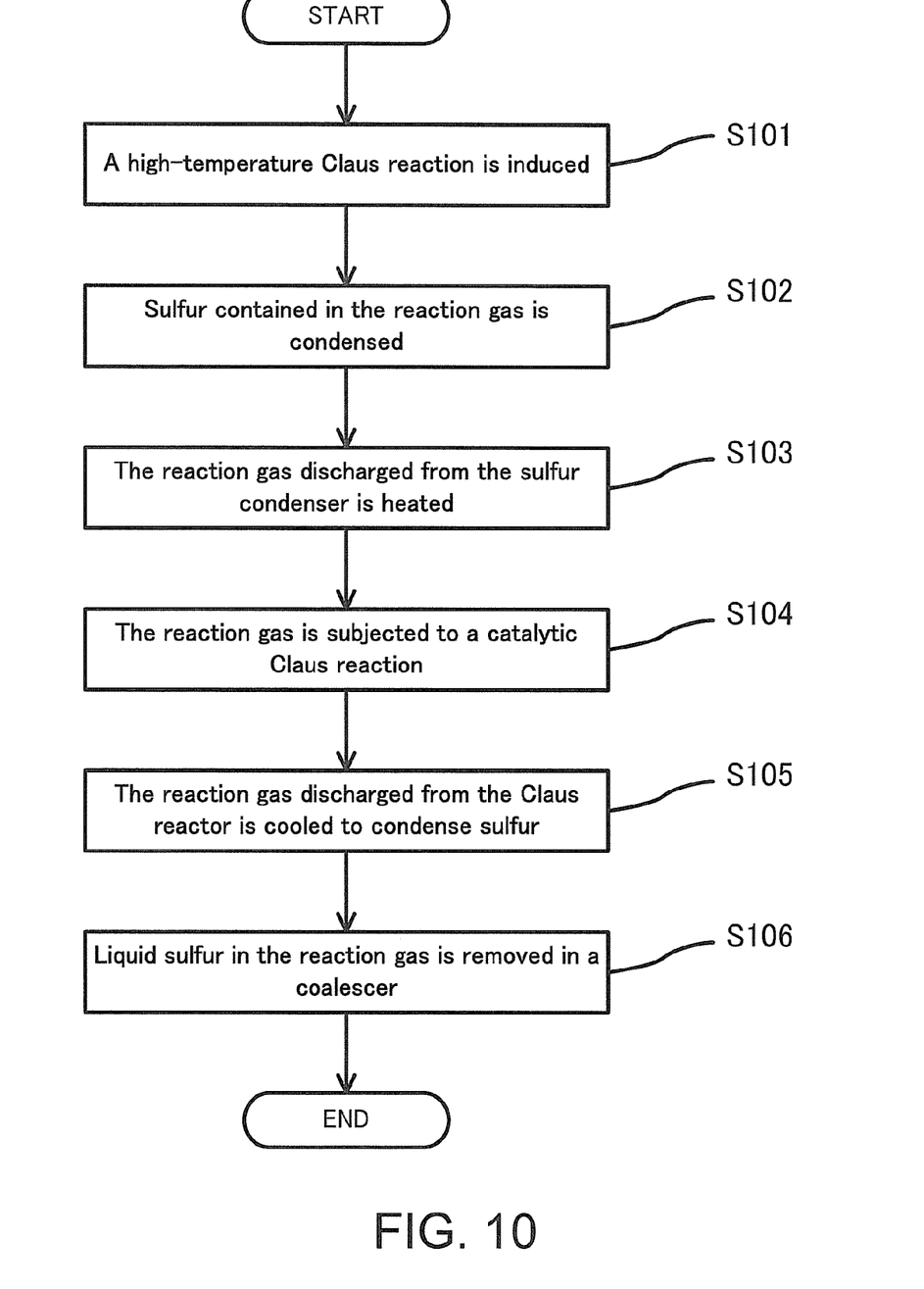
FIG. 10 is a flowchart illustrating a sulfur recovery method according to an embodiment.

FIG. 10 is a flowchart of a sulfur recovery method according to an embodiment. First, hydrogen-sulfide-containing gas and oxygen-containing gas are introduced into a reaction furnace and a high-temperature Claus reaction is induced between hydrogen-sulfide-containing gas and the oxygen-containing gas (S101). Next, the reaction gas discharged from the reaction furnace is cooled and sulfur contained in the reaction gas is condensed (S102). The reaction gas discharged from the sulfur condenser is heated with a reheater arranged above the sulfur condenser so as to be able to move relative to the sulfur condenser (S103). The reaction gas discharged from the reheater is subjected to a catalytic Claus reaction in a Claus reactor (S104). The reaction gas discharged from the Claus reactor is cooled to condense sulfur with a sulfur condenser (S105). In order to increase the recovery rate of the sulfuric components from the unreacted gas, two or more sets of the sulfur condenser, the reheater, and the reactor are provided and the condensing step S102, the heating step S103, the catalytic Claus reaction step S104, and the condensing step S105 are repeatedly performed in accordance with the number of the sets. After the steps S102 to S105, liquid sulfur in the reaction gas is removed in a coalescer by using a filter that causes sulfur droplets accompanying the reaction gas discharged from the sulfur condenser to contact each other to increase the size of the droplets (S106). Liquid sulfur is recovered in a sulfur pit.

Since the pressure loss occurring in pipes used in this sulfur recovery method is small, the pressure for feeding oxygen-containing gas can be decreased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed:

1. A sulfur recovery unit comprising:
   a reaction furnace configured to carry out a high-temperature Claus reaction between hydrogen-sulfide-containing gas and oxygen-containing gas introduced to the reaction furnace;
   a first sulfur condenser configured to cool reaction gas discharged from the reaction furnace and condense sulfur contained in the reaction gas;
   a reheater configured to re-heat condensed gas discharged from the first sulfur condenser;
   a catalytic Claus reactor configured to conduct a catalytic Claus reaction of reaction gas discharged from the reheater;
   a second sulfur condenser configured to cool reaction gas discharged from the catalytic Claus reactor and condense sulfur contained in the reaction gas; and
   a separator that allows sulfur droplets accompanying reaction gas discharged from the second sulfur condenser to collide with each other and removes the droplets thereby made larger,
   wherein the reaction furnace and at least one device selected from the group consisting of the reheater, the catalytic Claus reactor, the second sulfur condenser, and the separator are fixed to ground, and
   any device positioned between the fixed devices is disposed so as to be able to move relative to the fixed devices so that thermal stresses can be absorbed even when the temperature is increased due to a high-temperature Claus reaction or a catalytic Claus reaction.

2. The sulfur recovery unit according to claim 1, further comprising:
   a second reheater configured to re-heat condensed gas discharged from the second sulfur condenser;
   a second catalytic Claus reactor configured to conduct a catalytic Claus reaction of reaction gas discharged from the second reheater; and
   a third sulfur condenser configured to cool reaction gas discharged from the second catalytic Claus reactor and condense sulfur contained in the reaction gas,
   wherein the reaction furnace and at least one device selected from the group consisting of the reheater, the second reheater, the catalytic Claus reactor, the second catalytic Claus reactor, the second and third sulfur condensers, and the separator are fixed to ground, and
   any device positioned between the fixed devices is disposed so as to be able to move relative to the fixed devices so that thermal stresses can be absorbed even when the temperature is increased due to a high-temperature Claus reaction or a catalytic Claus reaction.

3. The sulfur recovery unit according to claim 2, further comprising:
   a third reheater configured to re-heat condensed gas discharged from the third sulfur condenser;
   a third catalytic Claus reactor configured to conduct a catalytic Claus reaction of reaction gas discharged from the third reheater; and
   a fourth sulfur condenser configured to cool reaction gas discharged from the third catalytic Claus reactor and condense sulfur contained in the reaction gas,
   wherein the reaction furnace and at least one device selected from the group consisting of the reheater, the second and third reheaters, the catalytic Claus reactor, the second and third catalytic Claus reactors, the second to fourth sulfur condensers, and the separator are fixed to ground; and
   any device positioned between the fixed devices is disposed so as to be able to move relative to the fixed devices so that thermal stresses can be absorbed even when the temperature is increased due to a high-temperature Claus reaction or a catalytic Claus reaction.

4. The sulfur recovery unit according to Claim 1, further comprising a pipe that connects the reaction furnace to the first sulfur condenser, the pipe having a letter U shape so that thermal expansion or thermal contraction is not restrained.

5. The sulfur recovery unit according to Claim 1, further comprising:
   a foundation section fixed to ground,
   wherein the first or second sulfur condenser is disposed on the foundation section so as to be able to move, and
   the foundation section has a slip-prevention member that restrains movements of the first or second sulfur condenser.

6. The sulfur recovery unit according to Claim 1, wherein the reheater is disposed above the first sulfur condenser so as to be able to move relative to the first sulfur condenser, and
   the reheater includes a supporting member that supports the reheater and allows the reheater to undergo displacement in a vertical direction.

7. The sulfur recovery unit according to Claim 1, wherein the reheater, the catalytic Claus reactor, and the second sulfur condenser are arranged so as to be able to move and the separator is fixed in place relative to a horizontal direction.

8. A sulfur recovery method for recovering sulfur from hydrogen sulfide-containing gas and oxygen-containing gas, the method comprising:
  introducing hydrogen-sulfide-containing gas and oxygen-containing gas into a reaction furnace and carrying out a high-temperature Claus reaction between the hydrogen-sulfide-containing gas and the oxygen-containing gas;
  cooling reaction gas discharged from the reaction furnace to condense sulfur contained in the reaction gas by using a first sulfur condenser;
  re-heating condensed gas, which has been discharged from the first sulfur condenser, by using a reheater;
  carrying out a catalytic Claus reaction of reaction gas, which has been discharged from the reheater, by using a catalytic Claus reactor;
  cooling reaction gas discharged from the catalytic Claus reactor to condense sulfur contained in the reaction gas by using a second sulfur condenser; and
  allowing sulfur droplets accompanying reaction gas discharged from the second sulfur condenser to collide with each other and removing the droplets thereby made larger by using a separator,
  wherein the reaction furnace and at least one device selected from the group consisting of the reheater, the catalytic Claus reactor, the second sulfur condenser, and the separator are fixed to ground, and
  any device positioned between the fixed devices is disposed so as to be able to move relative to the fixed devices so that thermal stresses can be absorbed even when the temperature is increased due to a high-temperature Claus reaction or a catalytic Claus reaction.

9. The sulfur recovery method according to claim 8, further comprising:
  re-heating condensed gas, which has been discharged from the second sulfur condenser, by using a second reheater;
  carrying out a catalytic Claus reaction of reaction gas by using a second catalytic Claus reactor, the reaction gas being discharged from the second reheater; and
  cooling reaction gas discharged from the second catalytic Claus reactor and condensing sulfur contained in the reaction gas by using a third sulfur condenser,
  wherein the reaction furnace and at least one device selected from the group consisting of the reheater, the second reheater, the catalytic Claus reactor, the second catalytic Claus reactor, the second and third sulfur condensers, and the separator are fixed to ground, and
  any device positioned between the fixed devices is disposed so as to be able to move relative to the fixed devices so that thermal stresses can be absorbed even when the temperature is increased due to a high-temperature Claus reaction or a catalytic Claus reaction.

10. The sulfur recovery method according to claim 9, further comprising:
  re-heating condensed gas, which has been discharged from the third sulfur condenser, by using a third reheater;
  carrying out a catalytic Claus reaction of reaction gas by using a third catalytic Claus reactor, the reaction gas being discharged from the third reheater; and
  cooling reaction gas discharged from the third catalytic Claus reactor and condensing sulfur contained in the reaction gas by using a fourth sulfur condenser,
  wherein the reaction furnace and at least one device selected from the group consisting of the reheater, the second and third reheaters, the catalytic Claus reactor, the second and third catalytic Claus reactors, the second to fourth sulfur condensers, and the separator are fixed to ground, and
  any device positioned between the fixed devices is disposed so as to be able to move relative to the fixed devices so that thermal stresses can be absorbed even when the temperature is increased due to a high-temperature Claus reaction or a catalytic Claus reaction.

11. The sulfur recovery method according to claim 8, wherein a pipe that connects the reaction furnace to the first sulfur condenser has a letter U shape so that thermal expansion or thermal contraction is not restrained.

12. The sulfur recovery method according to claim 8, wherein the first or second sulfur condenser is disposed on a foundation section so as to be able to move, and the foundation section is fixed to ground and has a slip-prevention member that restrains movements of the first or second sulfur condenser.

13. The sulfur recovery method according to claim 8, wherein the reheater is disposed above the first sulfur condenser and arranged so as to be able to move relative to the first sulfur condenser;
  a second pipe connects the sulfur condenser to the reheater; and
  the reheater includes a supporting member that supports the reheater and allows the reheater to undergo displacement in a vertical direction.

* * * * *